Dec. 27, 1955   F. F. POLNAUER   2,728,357
CIRCULAR LOOM
Filed Feb. 13, 1952   20 Sheets-Sheet 1

INVENTOR
FREDERICK F. POLNAUER
BY Stowell & Evans
ATTORNEYS

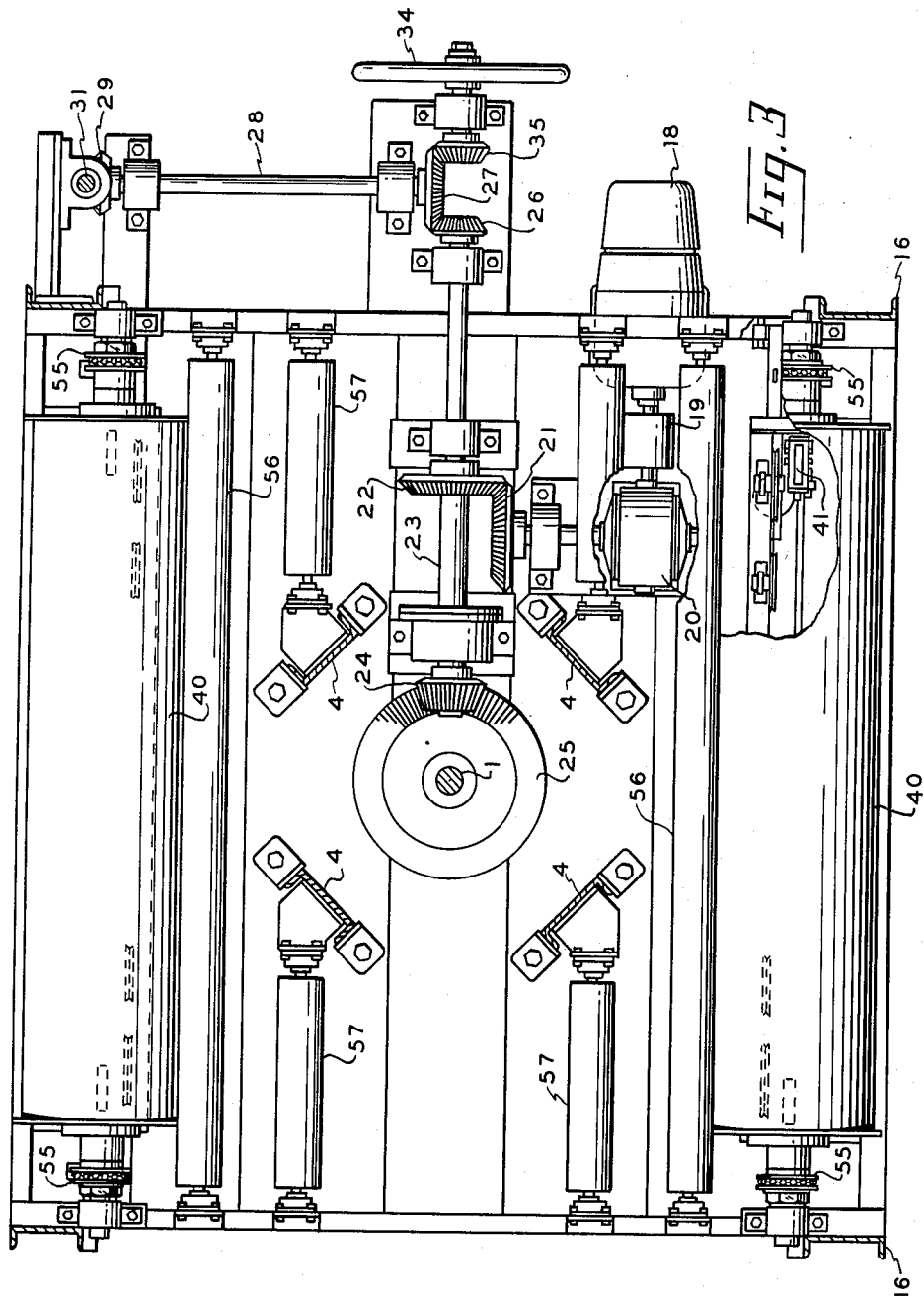

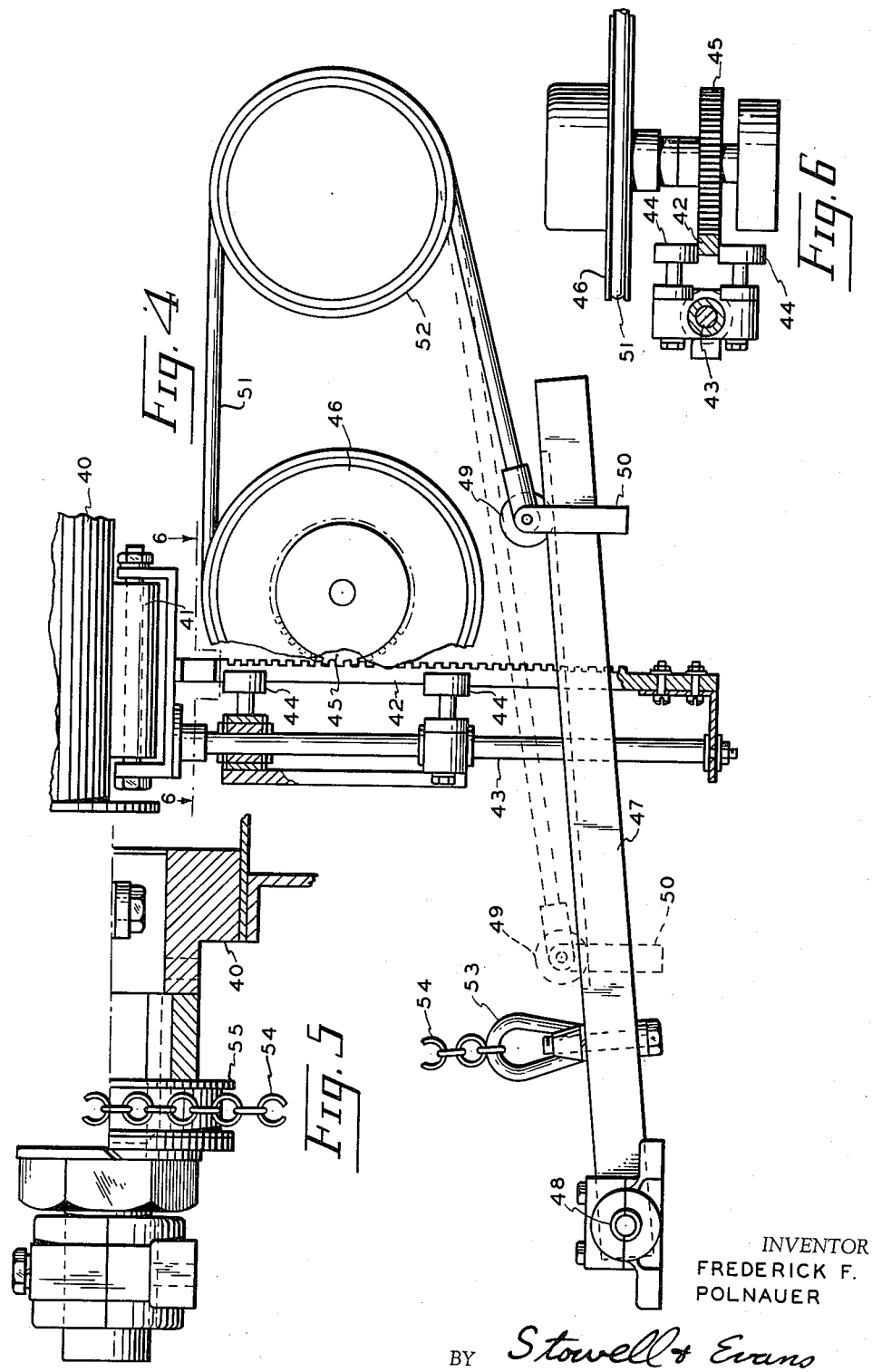

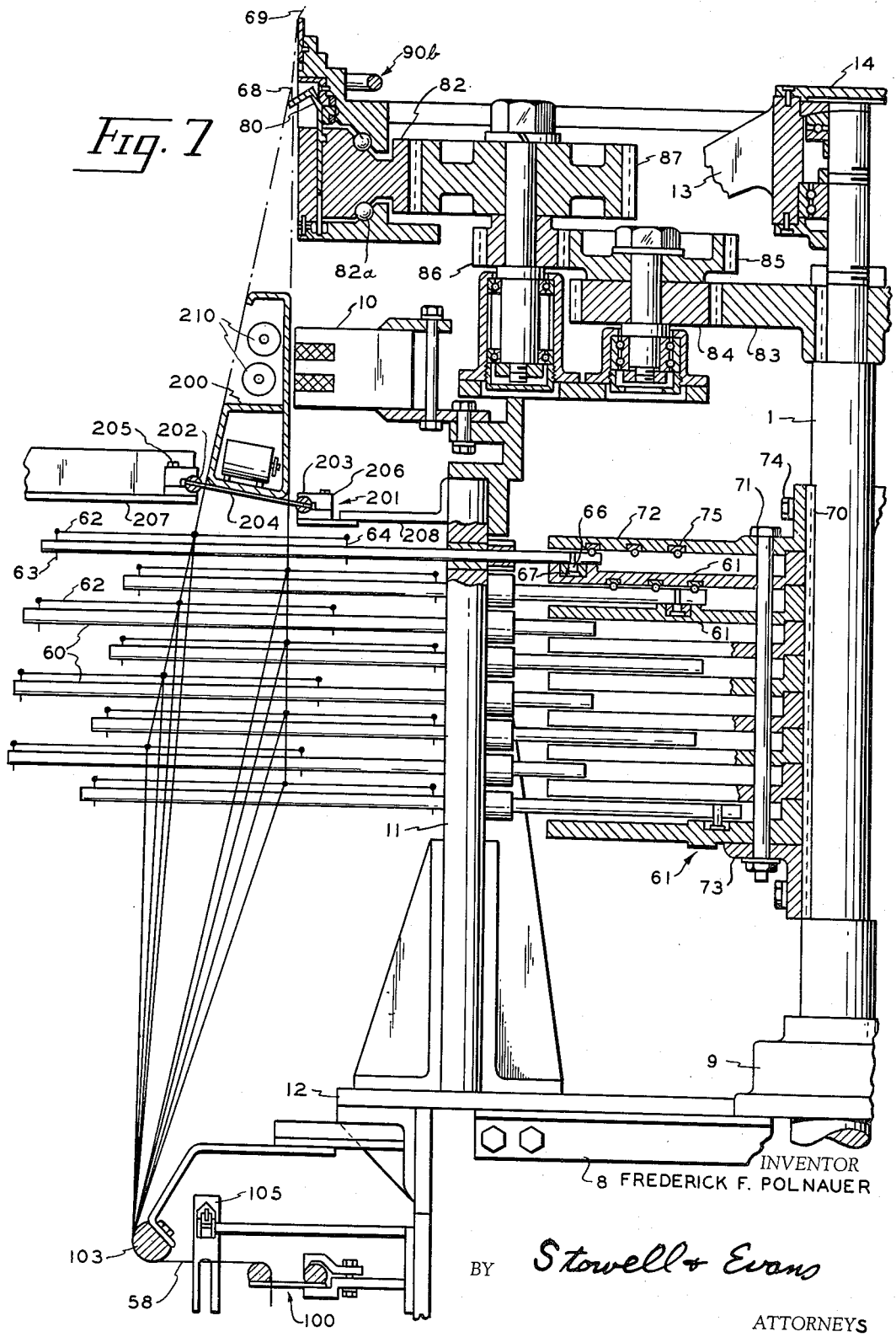

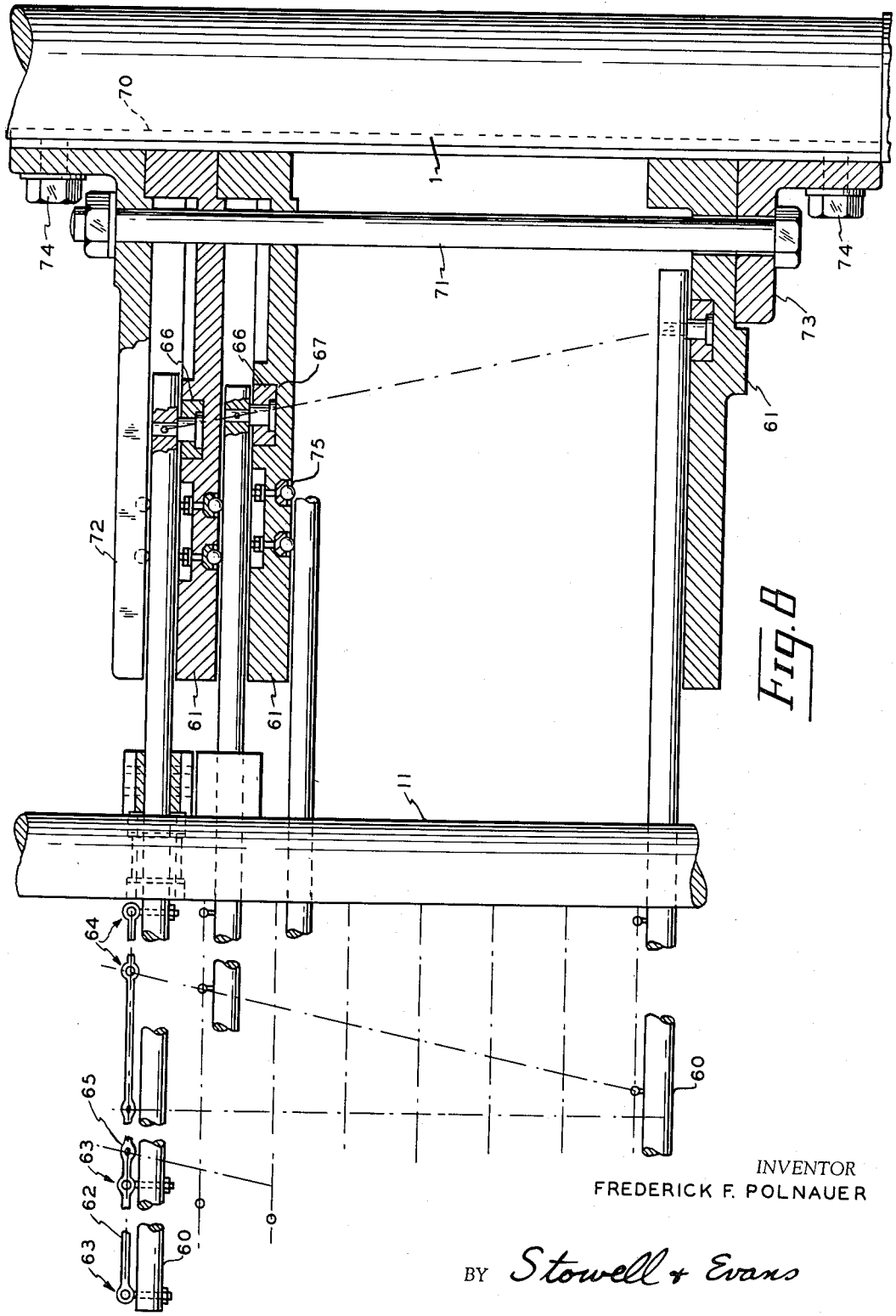

Dec. 27, 1955   F. F. POLNAUER   2,728,357
CIRCULAR LOOM
Filed Feb. 13, 1952   20 Sheets-Sheet 7

INVENTOR
FREDERICK F. POLNAUER

BY   *Stowell & Evans*

ATTORNEYS

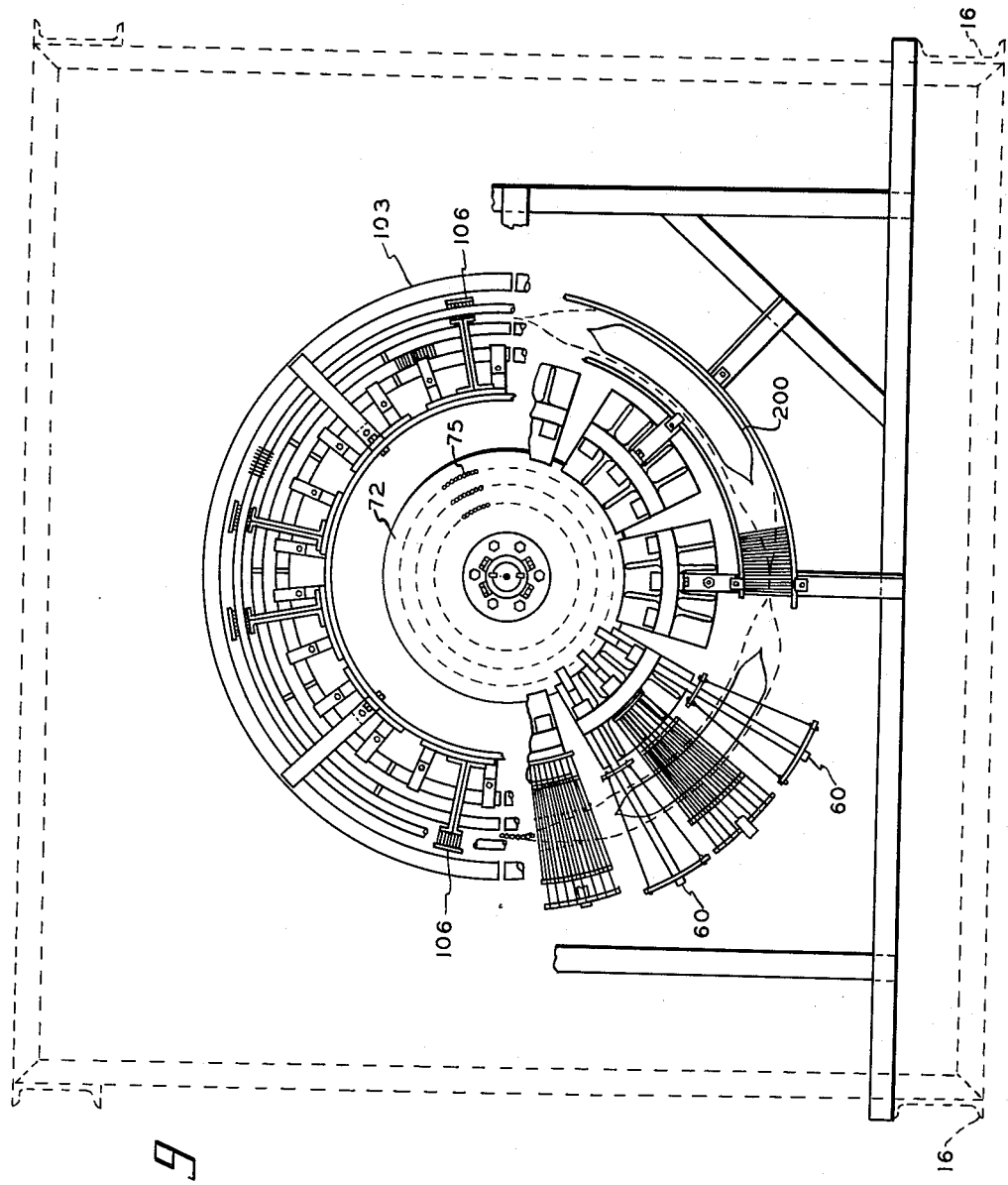

Dec. 27, 1955     F. F. POLNAUER     2,728,357
CIRCULAR LOOM
Filed Feb. 13, 1952     20 Sheets-Sheet 9
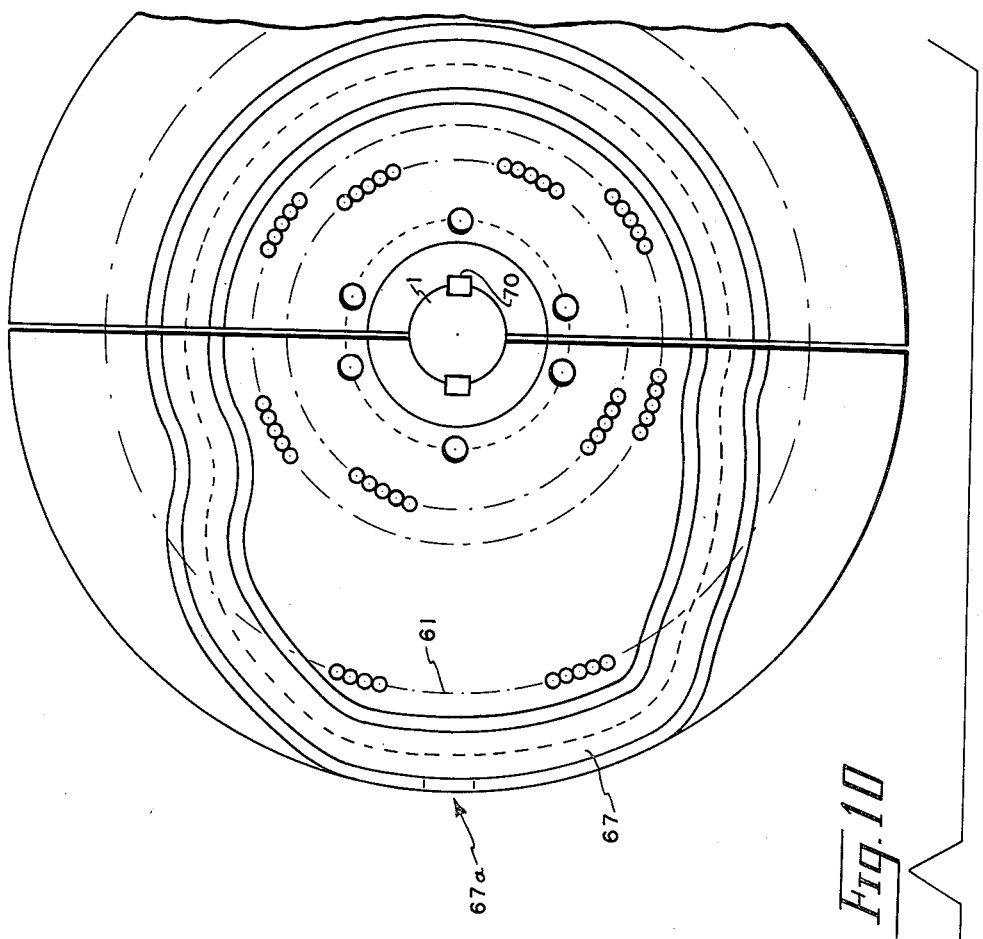
*Fig.10*
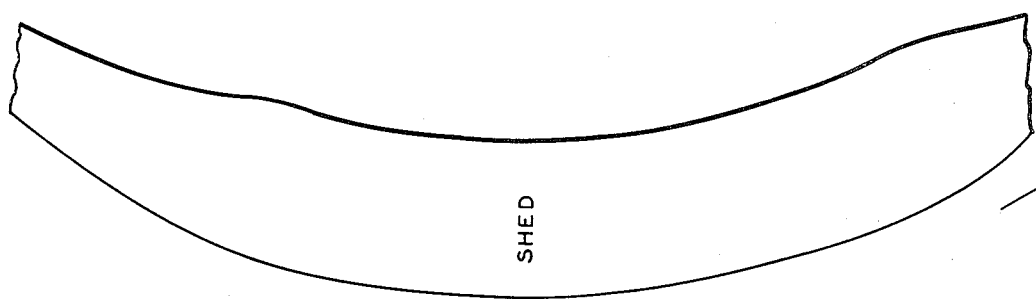
SHED
INVENTOR
FREDERICK F. POLNAUER
BY *Stowell + Evans*
ATTORNEYS Dec. 27, 1955   F. F. POLNAUER   2,728,357
CIRCULAR LOOM
Filed Feb. 13, 1952   20 Sheets-Sheet 10
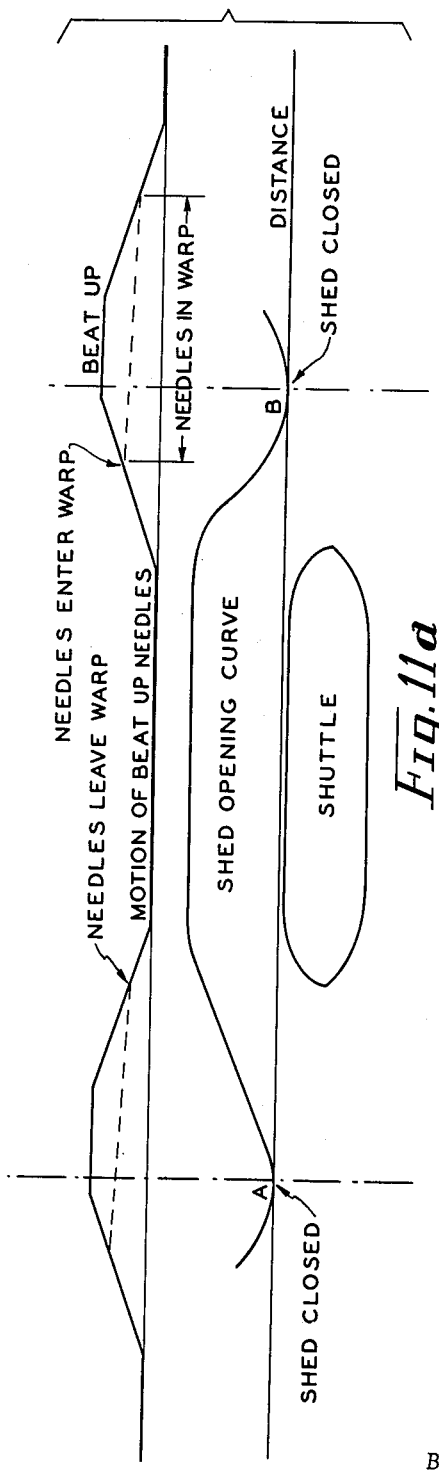
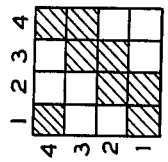
Fig.12
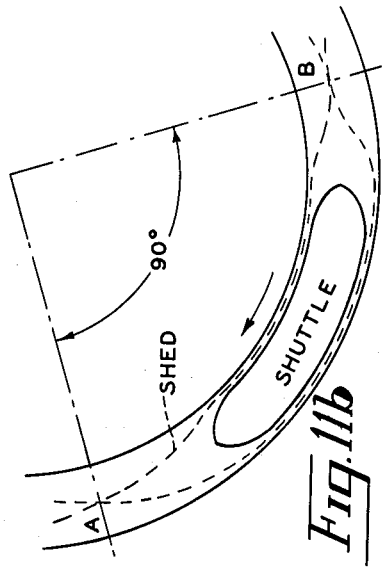
INVENTOR
FREDERICK F. POLNAUER
BY Stowell & Evans
ATTORNEYS

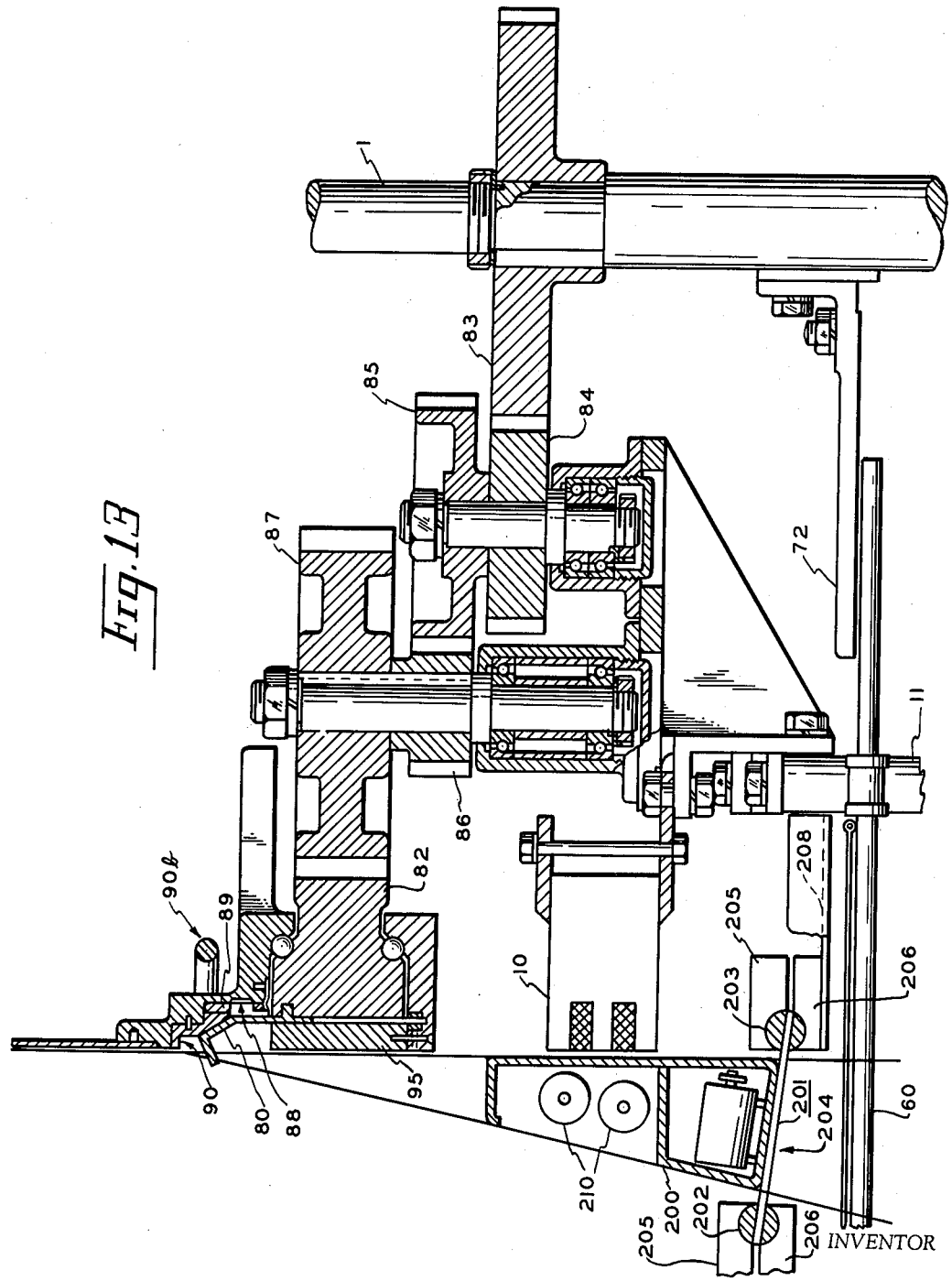

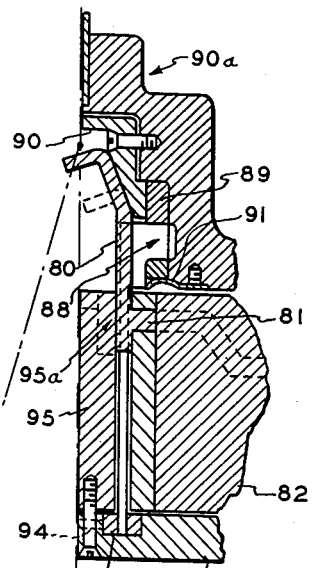
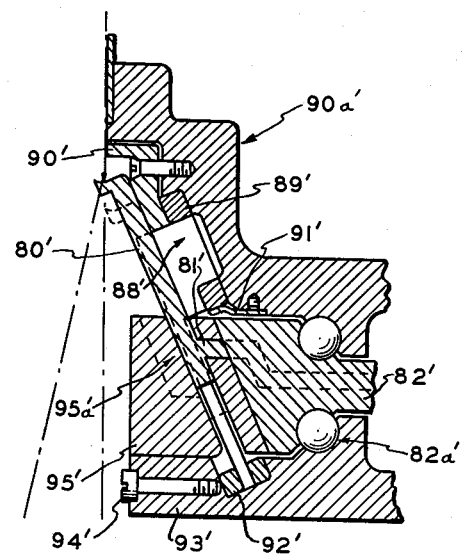
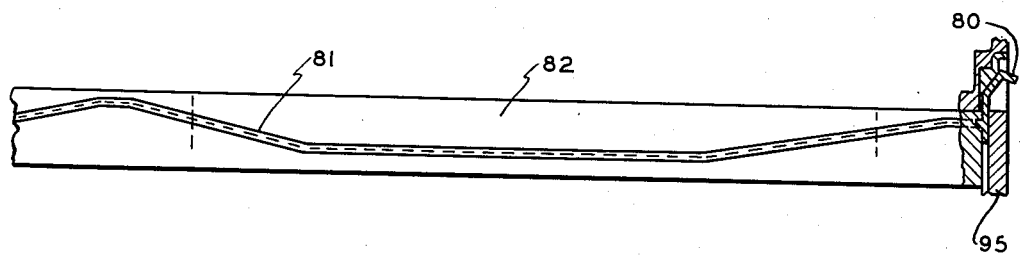

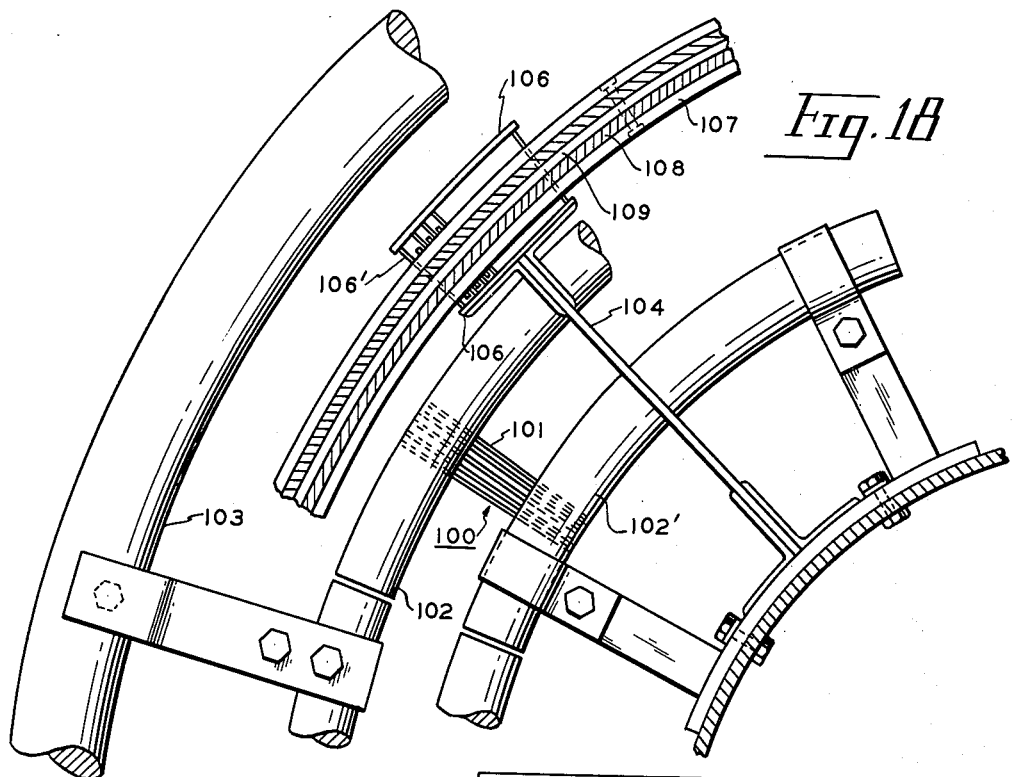
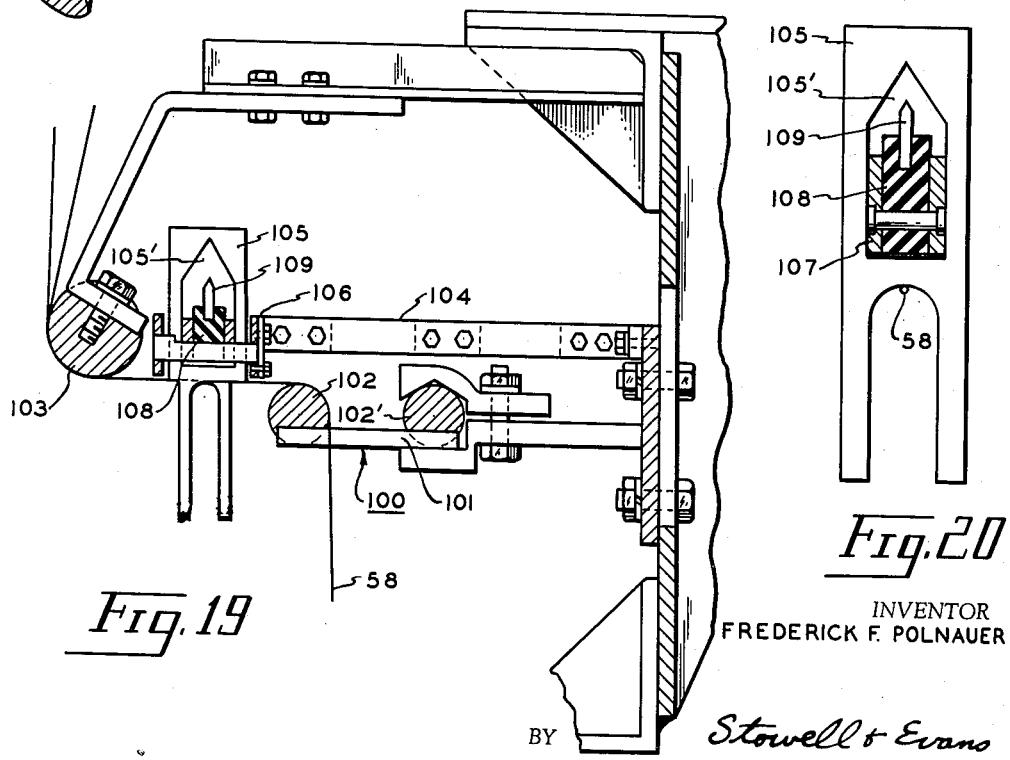

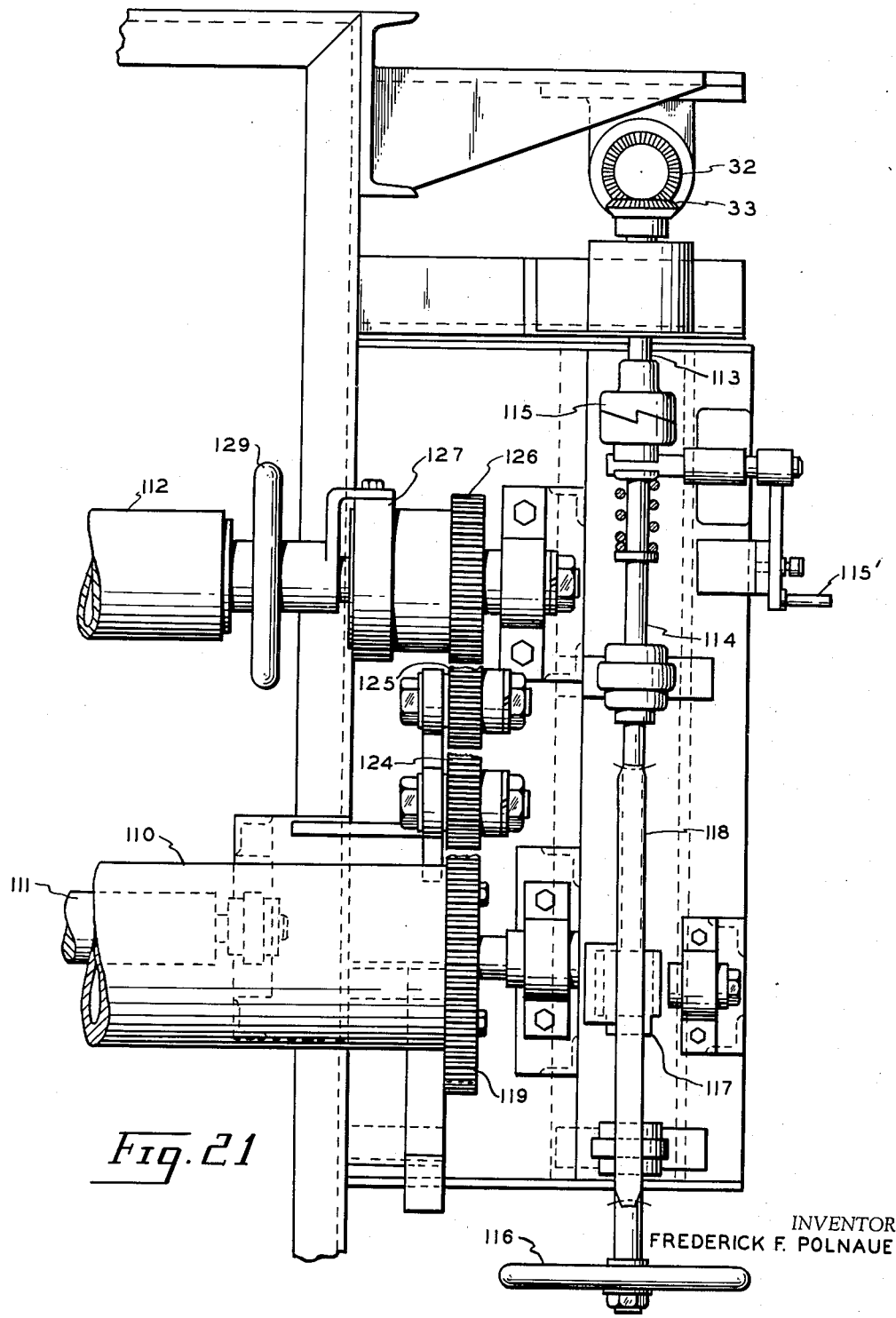

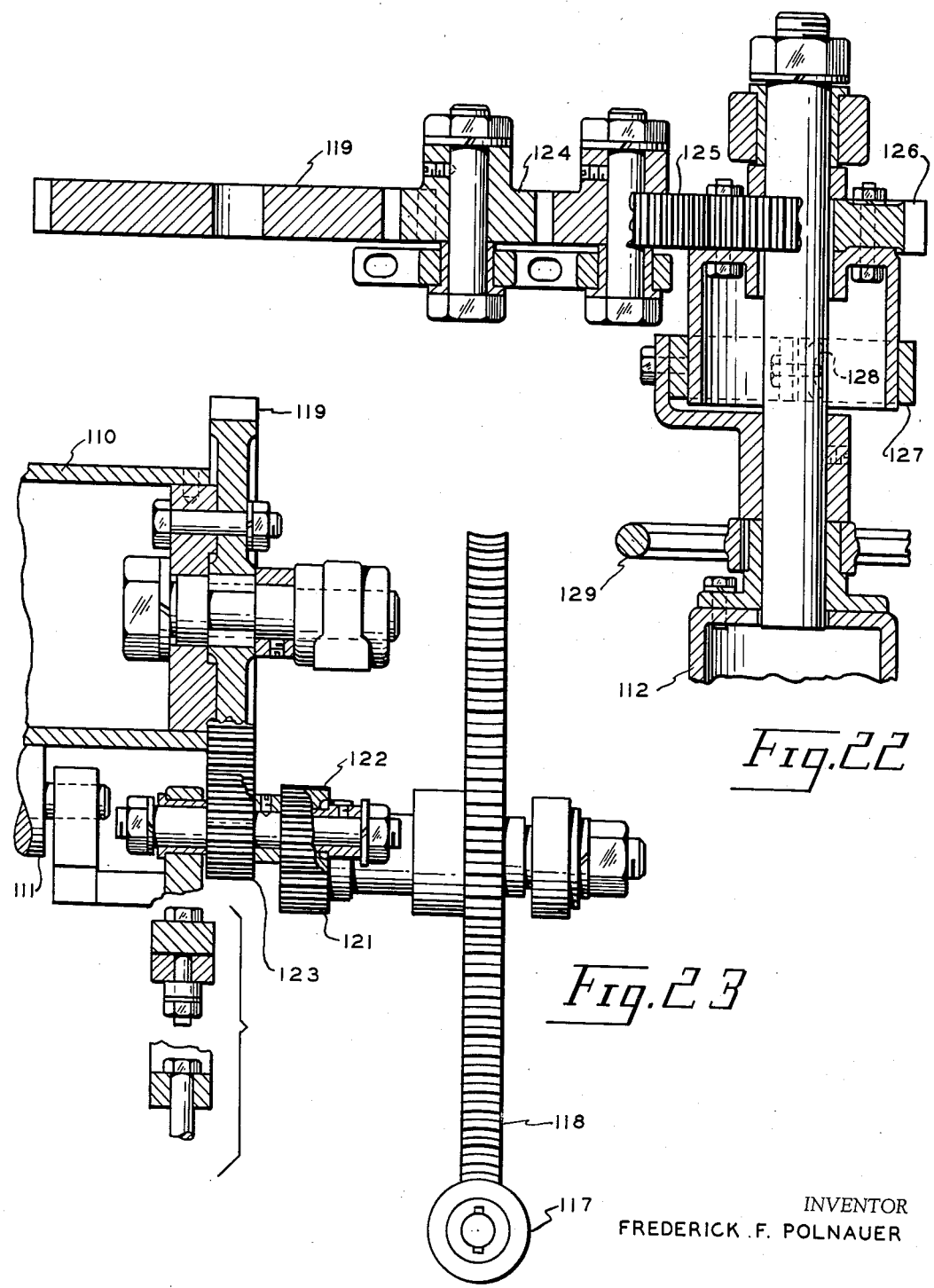

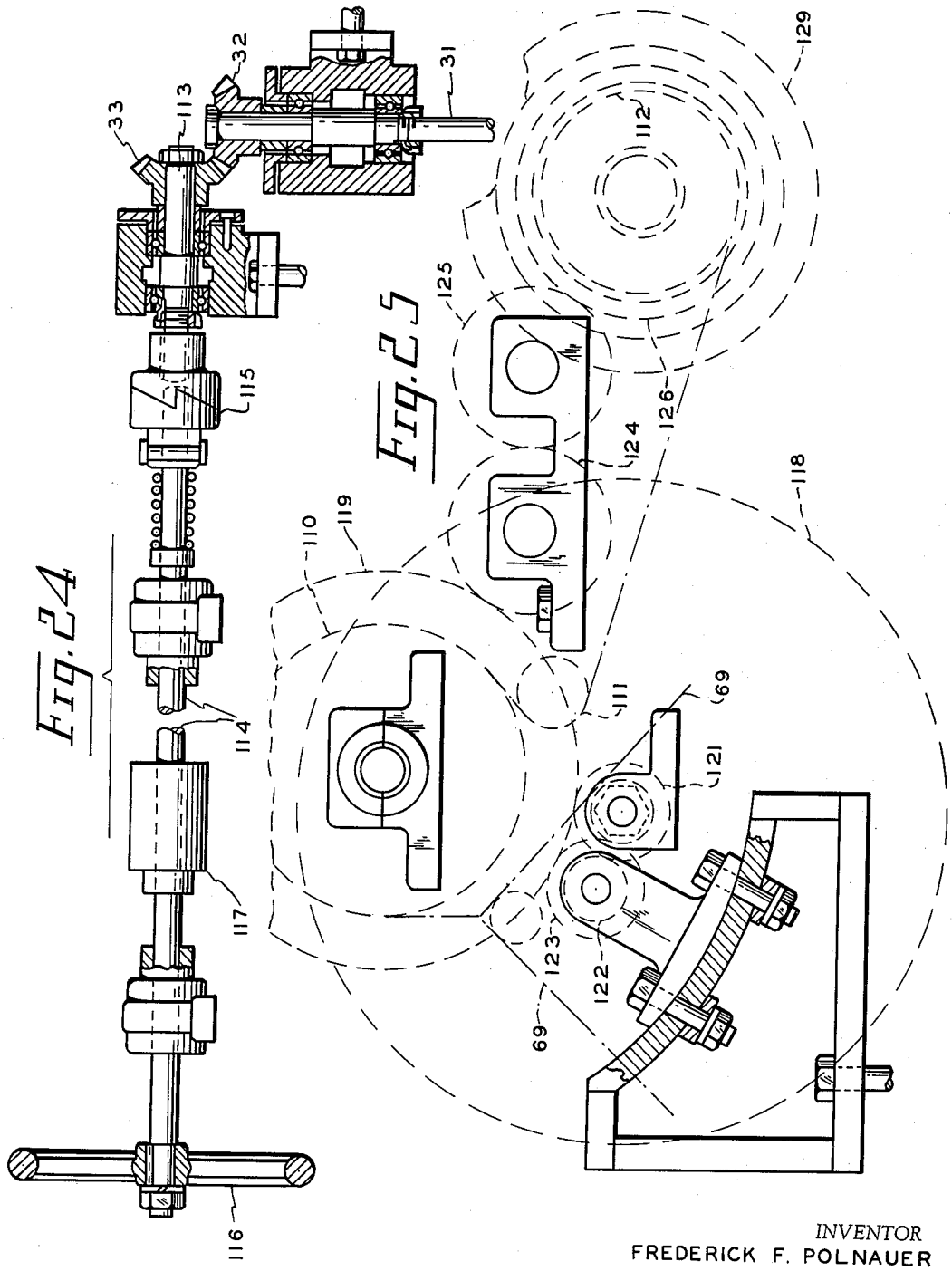

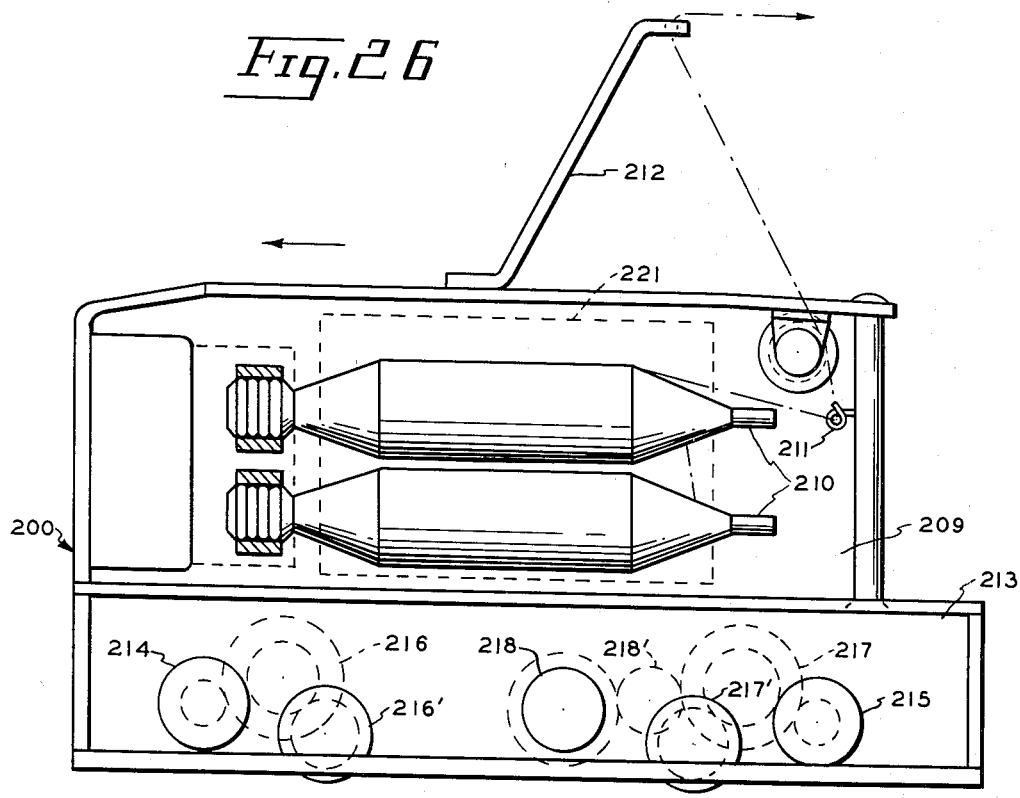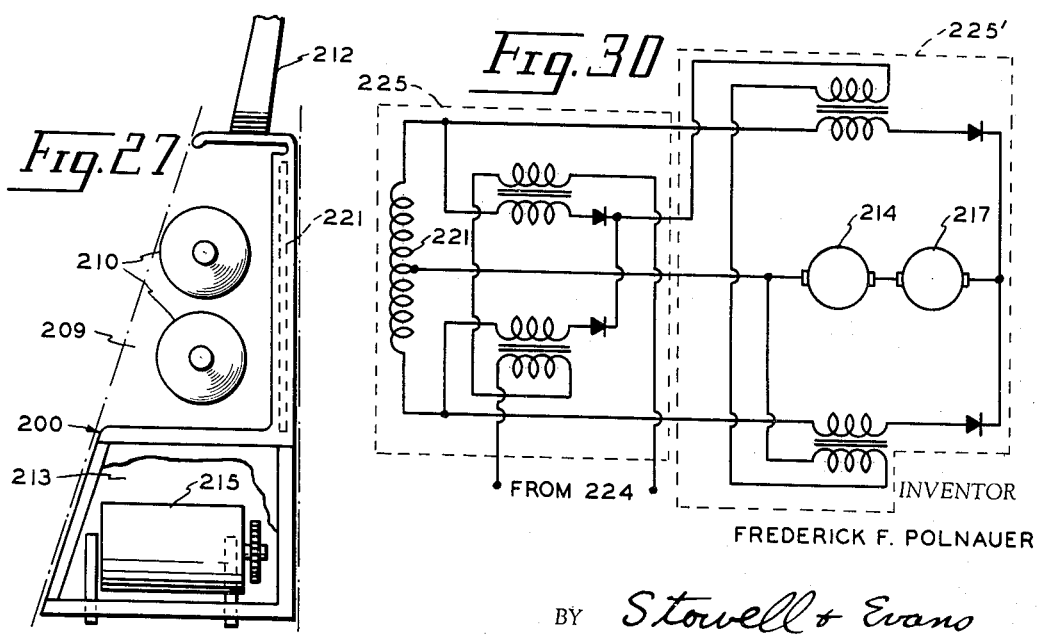

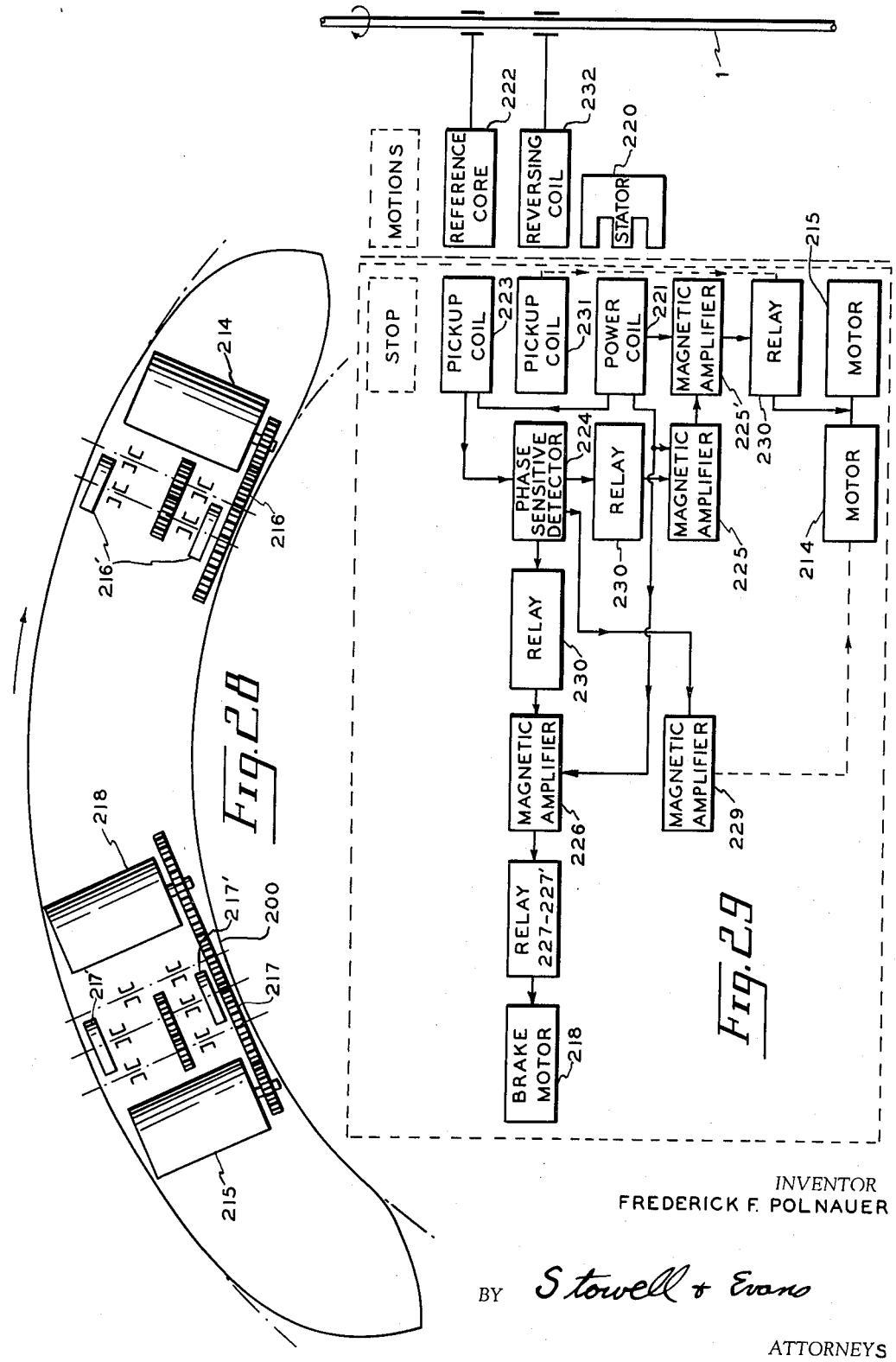

Dec. 27, 1955  F. F. POLNAUER  2,728,357
CIRCULAR LOOM
Filed Feb. 13, 1952  20 Sheets-Sheet 20
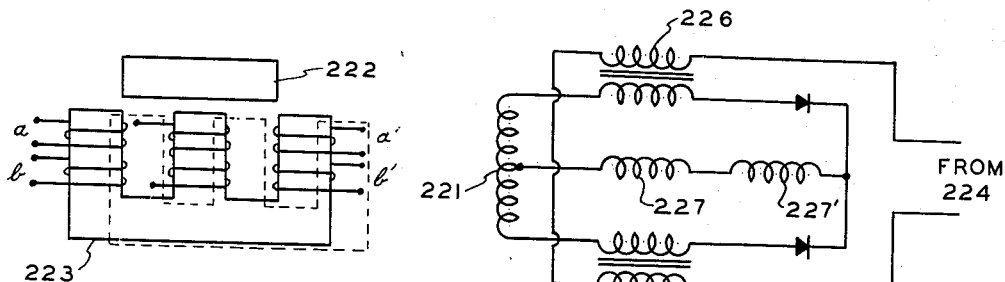
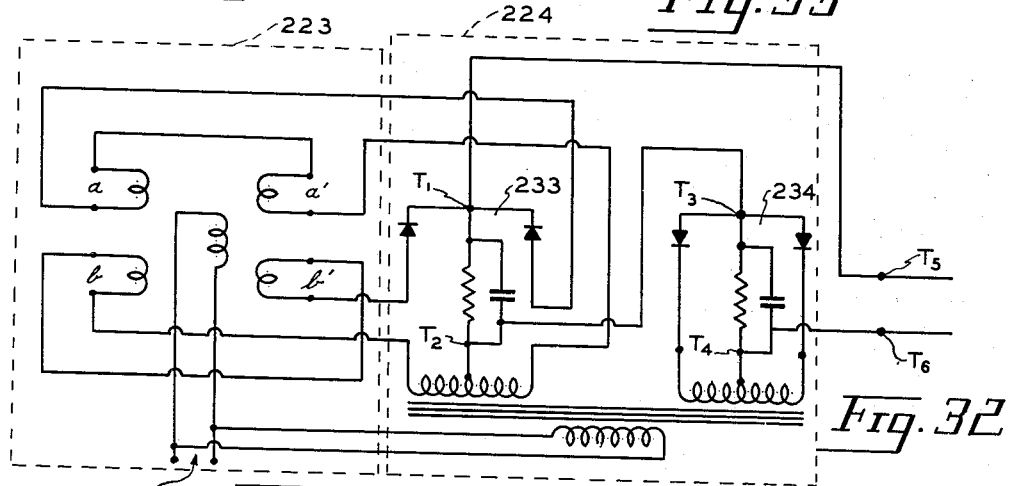
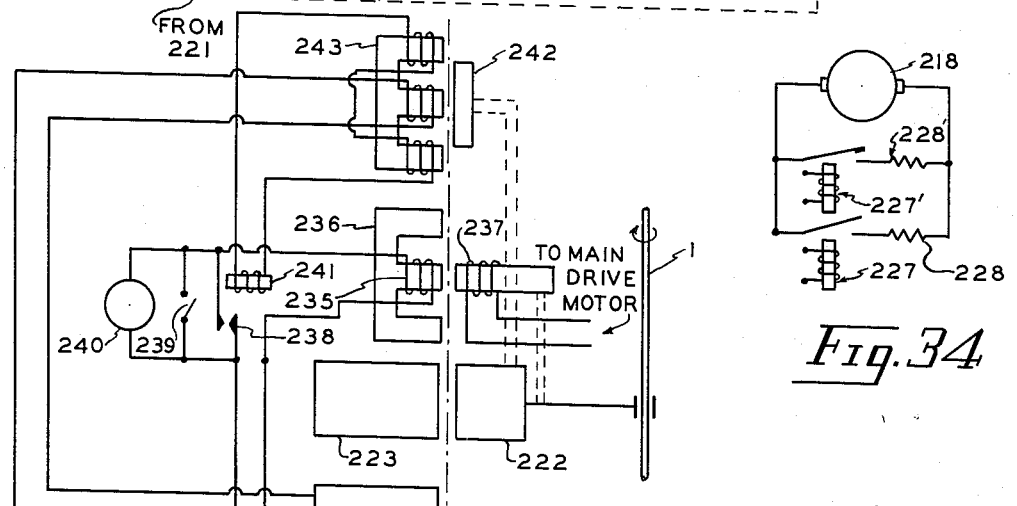
INVENTOR
FREDERICK F. POLNAUER
BY Stowell & Evans
ATTORNEYS United States Patent Office 2,728,357
Patented Dec. 27, 1955

2,728,357

CIRCULAR LOOM

Frederick Francis Polnauer, New York, N. Y., assignor to Rototex Research Corporation, New York, N. Y., a corporation of New York Application February 13, 1952, Serial No. 271,333

4 Claims. (Cl. 139—16)

This invention relates to improvements in circular looms.

Although circular looms wherein the weft-bearing shuttle or shuttles travel in a continuous rotary motion present in principle the possibility of much higher speeds of operation, and therefore much higher production rates, than looms with reciprocating shuttles, satisfactory continuous operation of such looms at high production rates has not been heretofore achieved.

A principal object of the invention is the provision of a practical circular loom construction whereby a high rate of production may be achieved, and cloth of better quality and in greater variety of weaves may be produced.

Another object of the invention is to provide an improve shedding mechanism for circular looms.

A further object of the invention is the provision of improved shuttle driving and control means for circular looms.

A still further object of the invention is to provide improved warp-tension control means for circular looms.

A further object of the invention is to provide an improved beat-up mechanism.

Other objects and advantages of the invention will be apparent from the following description of illustrative embodiments of the principles of the invention taken in connection with the accompanying drawings in which:

Fig. 3 is a plan view of the principal drive elements of the loom on line 3—3 of Fig. 1;

Fig. 4 is a fragmentary elevation, with parts broken away and in section, of the self-regulating warp let-off mechanism of the invention;

Fig. 5 is a fragmentary detail of the warp let-off mechanism;

Fig. 6 is a fragmentary detail view in partial section on line 6—6 of Fig. 4;

Fig. 7 is a fragmentary sectional elevation of the shedding mechanism of the loom showing also the warp stop and beat up mechanisms;

Fig. 8 is an enlarged fragmentary sectional elevation of the shedding cams and associated hardness mechanism;

Fig. 9 is a plan view, with parts broken away, of the shed portion of the loom;

Fig. 10 is a plan view of a shedding cam including a fragmentary diagrammatic representation of the corresponding shed;

Fig. 11a is a developed diagrammatic plan view showing the relation of a shuttle to the shed and to the operation of the beat-up mechanism;

Fig. 11 is a partial diagrammatic plan view showing the relation of the shuttle to the shed.

Fig. 12 is a diagrammatic representation of a typical weave pattern;

Fig. 13 is a fragmentary sectional elevation of the beat-up drive and beat-up mechanism;

Fig. 14 is an enlarged sectional elevation of the beat-up mechanism of Fig. 13;

Fig. 15 is an enlarged sectional elevation of a modified form of beat-up mechanism;

Fig. 16 is a fragmentary developed view of a section of the beat-up cam;

Fig. 18 is an enlarged fragmentary plan view of warp stop motion and warp distributing devices;

Fig. 19 is a sectional elevation of the warp stop motion and warp distributing devices;

Fig. 20 is an enlarged detailed view in partial section of the warp stop motion droppers;

Fig. 21 is a plan view of the cloth take-up mechanism;

Fig. 22 is a fragmentary view in partial section of a portion of the cloth take-up mechanism;

Fig. 23 is a fragmentary view in partial section of another portion of the cloth take-up mechanism;

Fig. 24 is a fragmentary sectional elevation of the cloth take-up mechanism drive;

Fig. 25 is a fragmentary elevation in partial section of elements of the cloth take-up mechanism;

Fig. 26 is a diagrammatic side elevation fo a shuttle adapted for use in the loom of the invention;

Fig. 27 is a diagrammatic end elevation of the shuttle of Fig. 26;

Fig. 28 is a diagrammatic plan view of the shuttle of Fig. 26;

Fig. 29 is a block diagram of shuttle drive and control circuits;

Fig. 30 is a diagram of a shuttle drive motor circuit;

Fig. 31 is a diagram of a rotating reference core of the shuttle drive and control circuit;

Fig. 32 is a diagram of a phase sensitive detector of the shuttle drive and control circuit;

Fig. 33 is a diagram of a shuttle braking motor circuit;

Fig. 34 is a diagram of a shuttle braking motor; and

Fig. 35 is a diagram of automatic stop circuits adapted for use in connection with the shuttle drive and control circuits.

*General organization*

Figure 1:
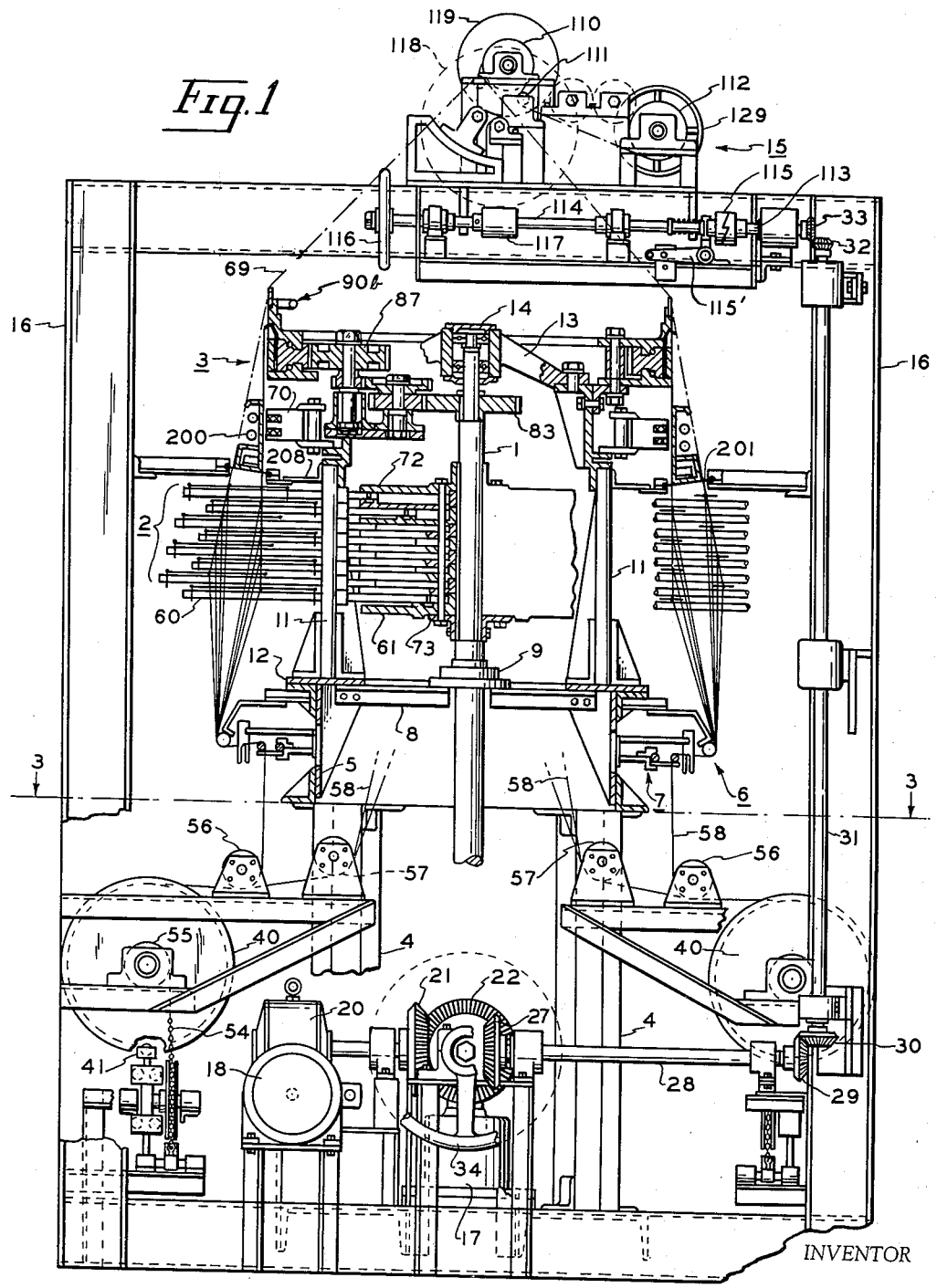
Fig. 1 is an elevation in partial section of a circular loom embodying the principles of the invention, looking endwise of the warp beams and cloth roll.
Figure 2:
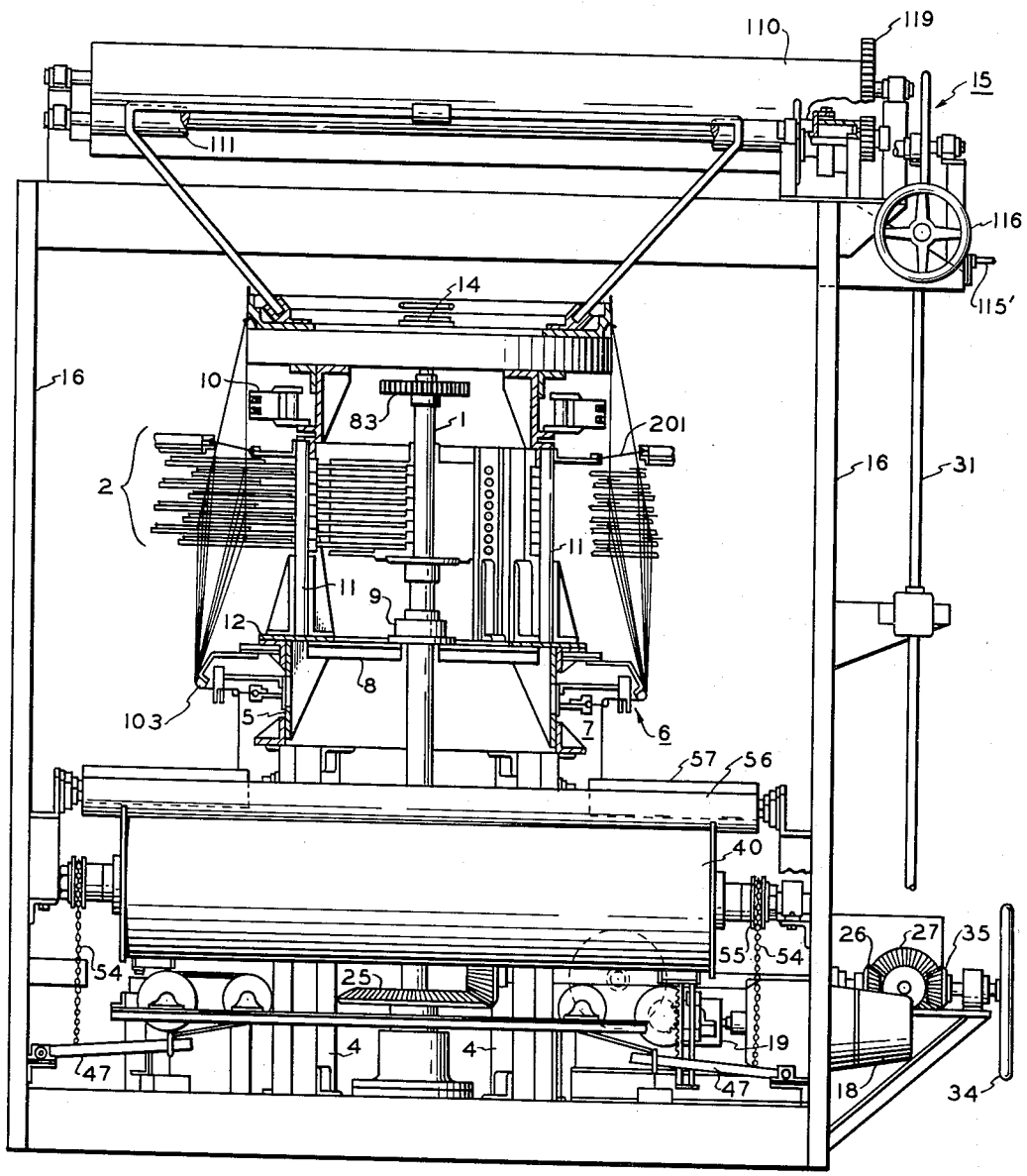
Fig. 2 is an elevation in partial section of the loom viewed at right angles to the view of Fig. 1.

Referring more particular to Figs. 1 and 2, it will be seen that the loom of the invention comprises a central vertical main shaft 1, driving the shedding mechanism generally designated 2 and the beat-up mechanism generally designated 3.

Figure 17:
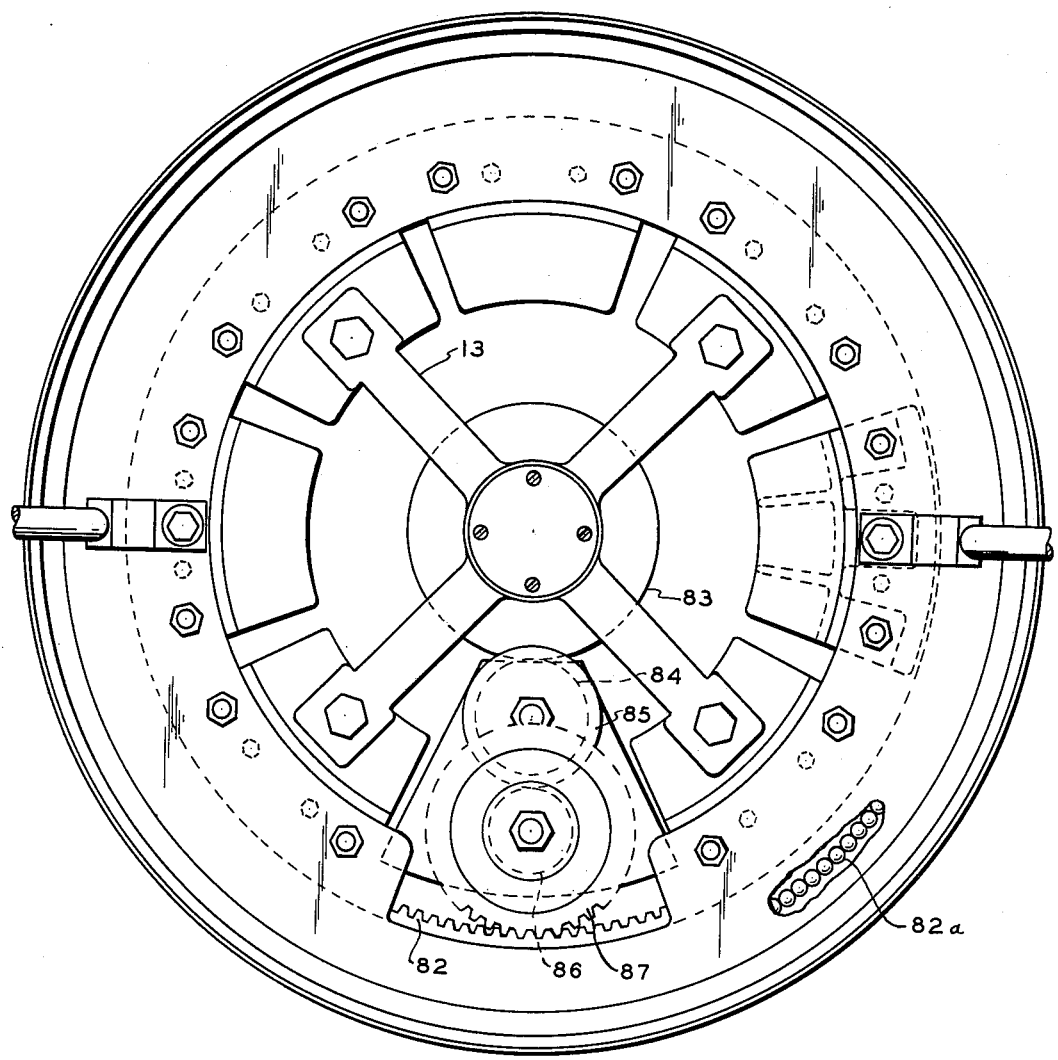
Fig. 17 is a plan view, with parts broken away of the upper bearing bracket and beat-up drive.

Supported on four channel members 4, is an annular drum member 5 concentric with main shaft 1. The annular drum carries the warp stop motion device generally designated 6 and the warp tensioning device generally designated 7, more fully described hereinafter, and supports through angle members 8 the central main shaft bearing 9. The harness shafts, beat-up mechanism and drive and the stator elements 10 of the shuttle drive, all more fully described hereinafter, are supported by sectional column brackets 11 mounted on top plate 12 carried by drum 5. Column brackets 11 also support top bearing bracket 13 (Fig. 17) which carries the top bearing 14 of the main shaft 1. The sectional arrangement of the column brackets 11 is very important to the ease of removal of the shedding cams 61 as well as for the general maintenance of the loom. By removing only a few brackets, the remainder can still support the entire top sub-assembly.

The cloth take-up mechanism, generally designated 15 and more fully described hereinafter, is supported by main frame members 16.

Main drive

The main driving shaft 1 is journaled in bottom bearing 17 and is driven by motor 18 which is connected through clutch 19 to reducing gear 20. The output of the reducing gear is connected by pinion 21 to gear 22 on countershaft 23, which drives gear 25 on shaft 1 through pinion 24 (Fig. 3).

The cloth take-up mechanism 15 is driven from shaft 23 through gears 26, 27, shaft 28, gears 29, 30, vertical shaft 31, and gears 32, 33.

When the motor 18 is disconnected from the reducing gear by clutch 19, the main drive shaft can be turned by hand with handwheel 34 through gears 35, 27, 26.

Warp let off

The warp let off mechanism is shown generally in Figs. 1–3 and, in detail, in Figs. 4–6. The warp wound on warp beams 40 is contacted by cylindrical feelers 41 mounted for rotation at the upper ends of racks 42 which are carried on slide rods 43 and are guided by rollers 44. Racks 42 mesh with gear 45 which is mounted coaxially with pulley 46. Lever bar 47, pivoted at 48, has a groove on its upper side in which wheel 49, with attached yoke 50 and weight, can slide or roll. Yoke 50 has a V-belt 51 attached to it. The belt 51 passes over idler pulley 52 to pulley 46 to which the other end of the belt is fixed. A swivel hook 53 is attached to lever bar 47 between the ends thereof and chain 54 attached to the hook, is wrapped around friction drum 55 mounted on warp beam 40. The other end of the chain is fixed to the frame of the loom.

Guide rollers 56, 57 serve to distribute the warp threads 58 around the circumference of the loom.

When the warp beam is loaded, the feeler 41 is in its lowest position and the weight is in its highest position on the lever bar. The weight used is determined by the amount of tension required for the yarn being woven. The location of the swivel hook 53, the length of travel of the wheel are determined mathematically as functions of the friction and tension required.

As the warp beam lets off the yarn, its diameter decreases. Since there is an upward force acting on the feeler due to the action of the pinion gear 45 on the rack 42 and the weight and pulley system, the feeler moves upward until it contacts the warp beam. This upward motion produced by the rotation of the pinion gear also rotates the pulley 46 which is mounted on the same shaft as the pinion gear. As the main pulley moves it lets off some of the V-belt causing the wheel 49 with the attached weight to roll down the lever bar. As the wheel and weight move down along the lever bar, the force acting on the chain 54 is reduced thus reducing the friction on the friction drum. In this manner, the proper warp tension is maintained automatically throughout the weaving process.

This let off mechanism is located on both sides of each warp beam. In this way warp tension is properly maintained across the whole warp beam. In addition, the warp tension of both beams relative to each other can be kept equal throughout the weaving process by adjusting both beams to the same tension at the beginning.

Shedding mechanism

Since the maximum loom speed is determined by the highest possible shedding speed, special provisions are made to guide the shafts stably and diminish the friction of the moving parts. The shedding mechanism 2 will be described with particular reference to Figs. 7–12.

The harness through which the ends of the warp have been drawn must be connected to a mechanism by means of which certain of them may be extended and others retracted so as to make a division or opening in the warp. Through the openings, or shed, thus formed, the shuttle travels and the pick of filling inserted. The relative position of the harnesses is then changed; some, or all, of those that were extended are retracted while others are extended so that a new shed is formed, through which the shuttle again passes and another pick of filling inserted. The harnesses are extended and retracted in a definite order, so that a certain weave will be followed out. The number of harnesses used governs the number of ways in which it is possible to operate the warp ends.

On the loom of the invention the extending and retracting of the harness shafts 60 is accomplished by means of cams 61 mounted on drive shaft 1. Figures 1, 2 and 7 show the arrangement of these cams. Each of the several harness shafts 60 carries a number of wire heddles 62 mounted on two heddle bars 63 and 64, one at the front and one at the back of the harness shaft. Each end in the warp that is to be extended or retracted in the same manner as this particular harness, is drawn through the eye 65 of a heddle on the harness shaft. The harness shaft 60 passes through frictionless bushings which are mounted in support 11 to a cam follower 66 which rides in a groove 67 cut into the shedding cam 61 (Fig. 10). By constructing the cam with a cam groove of the proper shape, the harness shaft may be made to move in any desired manner so that it will remain in or out while a given number of picks are being placed in the cloth. The harnesses that are farthest from the fell 68 of the cloth 69 move through a greater distance than those nearer to the fell in order that the warp yarn is moved through the same angle.

The cams 61 are constructed such that the cam groove 67 provides the desired motion to the harness. This desired motion can be seen on Figs. 11a and 11b.

The shedding cams 61 are split into sections (Fig. 10) and are connected to the drive shaft by means of two keys 70. Each section of the cam has several through bolts 71 going through it. This bolt presses all the cams together so as to make a compact unit. The through bolts have two end plates 72 and 73 connected to it as shown in Figs. 7 and 8. These end plates are keyed to the shaft and also connected by several set screws 74 in each end plate to the drive shaft. The end plates 72, 73 are not split as are the cams.

The bottom face of the shedding cams has several circular rows of steel balls 75 mounted in it. These balls serve to minimize the friction between the harness shaft 60 and the bottom of the cam when the cam rotates over the harness shaft and this shaft goes in and out. This mounting and construction of the cams is important to the ease in which they can be removed from the loom and replaced. The cams also act as a frictionless guide for the harness shafts. Slot 67a in cam 61 permits lateral removal of harness shafts 60 and cam followers 66.

Figure 8A:
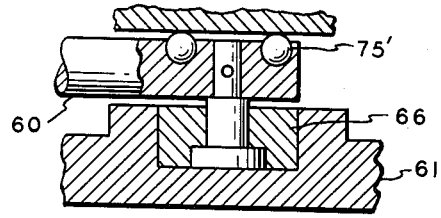
Fig. 8a is a fragmentary section of a modified form of the shedding cams and harness shafts.

In Fig. 8a is shown a modified arrangement in which the anti-friction balls 75' are carried in the harness shafts 60.

Figure 8B:
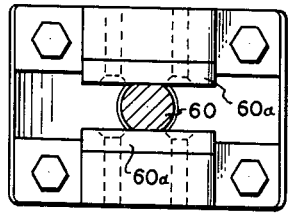
Figs. 8b and 8c are a detailed transverse section and plan, respectively, of an arrangement for guiding the harness shafts.
Figure 8C:
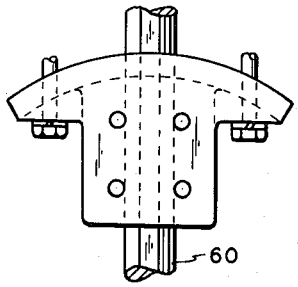
Figure 8D:
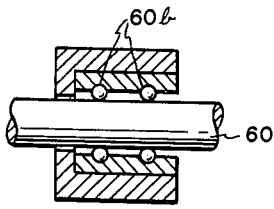
Figs. 8d and 8e are a detailed longitudinal and transverse section, respectively, of another arrangement for guiding the harness shafts.
Figure 8E:
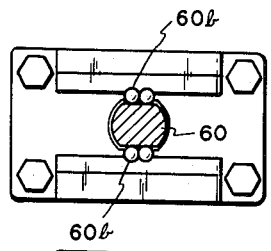

In order to prevent harness shafts 60 from rotating about their own axes during the reciprocal motion, the harness shafts are provided with flats upon which guiding means act, thus preventing twisting. Figs. 8b, 8c show an arrangement whereby the guides consist of flat plates 60a. Figs. 8d, 8e show a modified arrangement with guides consisting of a set of balls 60b to reduce friction.

The principle of operation of the shedding used in the loom illustrated is that one shuttle constantly weaves the same pick phase of the weave while the next shuttle weaves the next pick phase of the weave and so on.

A typical example of a weave pattern with four ends and four picks is shown in Fig. 12.

With a cam arrangement where each shuttle weaves a separate pick, the number of shuttles divided by the number of picks in the weave must be a whole number. The following table shows the number of picks that can be had for various numbers of shuttles.

| Number of shuttles: | Picks in the weave |
| --- | --- |
| 4 | 2, 4 |
| 5 | 5 |
| 6 | 6, 3, 2 |
| 7 | 7 |
| 8 | 8, 4, 2 |
| 9 | 9, 3 |
| 10 | 10, 5, 2 |
| 11 | 11 |
| 12 | 12, 6, 4, 3, 2 |

It can be seen from the above table that if a shuttle or a plurality of shuttles is removed from the loom one can get a cloth with varying picks in the weave. The number of harnesses used must be at least equal to, or a multiple of, the number of warp ends in the weave. Also the angular velocity of the shedding cams is equal to the angular velocity of the shuttle.

As an example, if there are 8 shuttles one can first weave 8 picks. Taking out one shuttle and one shedding cam, one gets 7 picks; in taking out another shuttle and another shedding cam one gets 6 picks and so on. In taking out shuttles, the active number of shedding cams has to be changed accordingly. Furthermore, the cam shapes of both the shedding cams and beat-up cam have to be changed.

Beat-up mechanism

The filling thread should not be beaten into the fell but rather should be pressed into the fell. The beat-up should be secure, sufficiently strong and at the same time, soft on the thread. The beat-up should be usable for very high speeds and for very tight and fine weaves, without chafing or damaging either warp or weft. The beat-up mechanism 3 of the loom will be described more particularly with reference to Figs. 13–17 of the drawings.

The resilient steel beat-up needles 80 are actuated by cam groove 81 in cam ring 82 which is driven from shaft 1 through gears 83, 84, 85, 86 and 87, gear 87 meshing with the teeth on the inner face of the cam ring. The needles 80 are guided by blades 88 which are part of reed 89. Cover plate 90 retains the top part of the reed. The lower part of the upper section is held by leaf spring 91 and the lowest part of the reed is held in groove 92 in stationary support plate 93 by means of set screw 94. Ring 95 guides the needles and prevents them from dropping out radially. The outer face of plate 90 is shaped to deflect the needles into the warp as they are raised by the cam to provide a firm but thread-protecting beat-up into the fell of the cloth.

In the modified form of beat-up mechanism shown in Fig. 15, the cam ring 82' has an angular outer face providing a frustoconical surface disposed at an agle to the shed so that the beat-up blades 80' may be straight and do not have to be resilient since they enter the shed at an angle.

The cam rings 82, 82' are supported by ball bearings 82a and 82a' respectively. Slots 95a, 95a' permit the loading and exchanging of beat-up needles as required, which can be done by locking the gear train and moving cover plates 90a, 90a' by means of handle 90b.

The developed plan of the beat-up cam groove 81 is shown in Fig. 16 and the time relation between the motion of the beat-up needles and the shed opening is diagrammatically shown in Fig. 11a.

Warp stop mechanism

The warp stop mechanism 6 is more particularly shown in Figs. 18–20.

The warp threads 58 pass from guide rollers 56, 57 (Figs. 1, 18 and 19) to the plurality of sectional reeds 100 consisting of blades 101 which are held together by ring segments 102, 102'. The reeds 100 have a dual purpose: (1) to distribute the warp ends evenly about the circumference, and (2) to regulate the warp thread tensions of the individual warp thread groups in such a manner that irregularities in the warp thread tension caused by the transition from the parallel into the circular distribution of the warp threads may be avoided. Regulation is accomplished by raising or lowering the individual reeds 100 which causes different tensions in the warp threads as required. From reeds 100, the warp threads pass over guide ring 103 into the shed.

The warp stop motion is supported by blades 106' which are held together by frame 106 and thus form a small reed segment. The droppers 105 are vertically slidable between the blades 106'. There is a plurality of frames 106 existing, each of which is supported by a bracket 104. Between the rings 102 and 103 is the warp stop motion, comprising a plurality of droppers 105, one for each warp thread. The droppers 105 consist of thin metal plates having two dependent legs forming a warp slot and having a large eye 105' in their upper portion. Passing the eye 105' of the droppers is a conductive ring 107 carrying an insulating insert 108 within which is mounted an upstanding conductive contact strip 109. Upon the breaking of a warp thread the corresponding dropper drops into contact with strip 109 closing a circuit between the strip 109 and ring 107 which actuates suitable means (not shown) for stopping the loom.

Cloth take up

The cloth take up mechanism 15 is shown generally in Figs. 1 and 2, and in greater detail in Figs. 21–25.

The completed fabric 69 is drawn from the fell 68 upward over take up roll 110 under idler roll 111 and then collected on the cloth roll 112. Gear 32 on the upper end of vertical shaft 31 engages gear 33 on horizontal shaft 113 which actuates extension shaft 114 through spring-loaded clutch 115, which can be released by means of crank 115'. Shaft 114 carries a hand wheel 116 at the end opposite the clutch and also carries worm 117 which engages gear 118. When the clutch is disengaged the worm may be turned by means of the hand wheel. Gear 119 attached to take up roll 110 is driven from gear 118 through gear train 121, 122, 123. Gear 122 is the change gear, the size of which may be varied to change the speed of the take up roll 110 so the cloth will be drawn from the loom at a rate required to give the desired number of picks per inch in the fabric.

Cloth roll 112 is driven from gear 119 through gears 124, 125 engaging gear 126 connected to the cloth roll. Friction clamp 127 allows the cloth roll 112 to be wound with any desired degree of tension by tightening the thumbscrew 128 which tightens the friction on the cloth roll. By loosening the friction clamp the cloth roll may be operated by hand wheel 129 when taking a cut of cloth from the loom.

The shuttles

The shuttles 200 travel in the rotating sheds upon a circular track formed by reed 201 (Fig. 7). Reed 201 consists of two pairs 202, 203 of rings horizontally split and supporting between them metal strips or wires 204 which are spaced equal distances apart. The reed rings are held together by clamps 205, 206 supported from the frame of the loom by brackets 207, 208.

A form of shuttle suitable for use in the loom of the invention is shown semi-diagrammatically in Figs. 26, 27 and 28. It comprises a bobbin compartment 209, holding one or a plurality of bobbins 210 from which the filling thread runs out through eye 211 to an eye in standard 212, and a motor compartment 213 including front and rear drive motors 214, 215 driving wheel pairs 216', 217' through gear trains 216, 217, respectively, and a brake motor 218, connected to rear wheel pair 217' through gears 218', 217.

The shuttle drive

The novel shuttle drive of the invention embodies two principles: the driving of the shuttle by transferring driving power into the shuttle across an airgap by electromagnetic induction from a stator; and the synchronization of each shuttle by accelerating or decelerating it in accordance as its actual position is retarded or advanced with respect to the position of exact synchronization.

These principles, of course, are applicable whether one or a plurality of shuttles are used. They may be applied in a number of ways:

I. A rotating electromagnetic polyphase field generated by a stator positioned adjacent the shuttle track generates propelling forces in the power receiving element of the shuttle, for example, a metal plate or a winding.

A. When the power reception within the shuttle is not subject to control, as when a metal plate is used as the power pick-up element, synchronization of the shuttle may be effected by external stationary control coils positioned at intervals adjacent the shuttle track. These control coils provide the required accelerating or decelerating forces by strengthening or weakening the main rotating field according as the shuttle passes the control coil earlier or later than exact synchronism.

B. The power receiving element in the shuttle may be a winding connected to a control circuit including sensing elements in the shuttle which respond to the relative position of the shuttle with respect to reference elements. The internal control circuit may not only decrease or increase the effective response of the power receiving element in accordance with the relative position of the shuttle but may actuate positive braking means when the shuttle is to be retarded.

II. The power inductively transferred to the shuttle induces a shuttle driving force by inducing power in a winding carried by the shuttle, which power may be used to drive motors, which may include braking motors, in the shuttle and is subject to control by position sensing elements.

A shuttle driving arrangement embodying the principles of the invention and particularly of the type described under II above, is shown for illustrative purposes in Figs. 26–35 of the drawings.

The principal components of the drive are shown in the block diagram of Fig. 29. The single phase windings of the stator 220 induce in the power coil 221 (the power pick-up element of the shuttle) an A. C. voltage. Shuttle motion occurs only when the reference core 222, rotating with the main loom shaft is put into motion, thereby generating an "error" signal in pick-up coil 223. This error signal is fed into phase sensitive detector 224, from which it passes to two-stage full wave self-saturating magnetic amplifier 225, 225' and also to the brake magnetic amplifier 226.

The phase of the transmitted error signal is determined by the direction of displacement of the pick-up coil 223 from the reference core 222 and the magnitude of the signal by the amount of displacement. Thus the magnitude of the eventual power supply to the driving or brake motors will be proportional to the displacement of the shuttle from the position of synchronism from the main shaft so that the force applied to the shuttle will not only be in a direction to correct the displacement but of a magnitude proportional to and varying with the amount of the displacement. This will appear more clearly from Figs. 28, 33 and 34. Drive motors 214, 215 drive the running gear trains 216, 217. Brake motor 218 being also connected with running gear train 217 is forced to idle along while the error is negative (shuttle falling behind the main shaft speed) or zero. With a positive error, however (shuttle running ahead of the main shaft speed), a series of relays 227, 227' are successively energized through magnetic amplifier 226 and successively connect different resistors 228, 228' into the braking motor circuit which thereby directly exerts on the running gear train 217 a braking action increasing with increasing amount of positive displacement of the shuttle.

By providing slip rings on motors 214, 215 and connecting them to magnetic amplifier 229 which does not receive power from power coil 221, a braking action due to the variable load of the magnetic amplifier 229 on the slip rings can be effected, auxiliary to or replacing brake motor 218.

The direction of shuttle movement may be reversed by means of a reversing relay 230 which reverses the armature voltages of motors 214, 215 and the input to the magnetic amplifier control windings 225, 225'. Relay 230 is energized from coil 231 mounted on the shuttle. Power is induced in coil 231 by reversing coil 232 on the rotating reference which is energized when the direction of rotation is to be reversed.

The wiring diagram of two stage magnetic amplifier 225, 225' controlling drive motors 214, 215 is shown in Fig. 30.

The wiring of error pick-up coil 223 is shown in Figs. 31 and 32. It has a 3-legged laminated core the middle leg of which carries the energizing coil which is connected to power coil 221. The outer legs carry control coils $a$, $b$ and $a'$, $b'$ respectively. The pair of windings $a$, $a'$ and $b$, $b'$ are connected in series. Opposite the core of coil 223 is the rotating laminated reference core 222 which rotates at loom speed.

When the shuttle is rotating in full synchronism with the loom shaft, the reference core 222 will be exactly centered between the outer legs of 223. In this case magnetic balance will exist between the outer legs and the induced voltages in control coils $a$, $b$ and $a'$, $b'$ will be equal. If the shuttle falls behind the reference core 222, as indicated in dotted lines in Fig. 31, the magnetic balance between the core legs will be disturbed and a larger voltage will be induced in coils $a$, $b$ than in coils $a'$, $b'$, and a voltage is generated between $a$ and $a'$ and $b$ and $b'$ having an amplitude proportional to the amount of displacement and a phase depending on the direction of displacement. The voltages $(a-a')$ and $(b-b')$ are superimposed on the voltage rectifier 233 of detector 224 (Fig. 32). The magnitude of the rectified voltage $V_1$ across terminals $T_1$, $T_2$ will be increased when the error is in one direction and decreased when the error is in the other direction, and will vary around a mid-value voltage $V_m$, the amount of variation depending on the magnitude of the error.

In order to obtain a D. C. voltage truly proportional to the magnitude and direction of the error (displacement), a second rectifier 234 is provided in series with 233. The D. C. voltage $V_2$ of rectifier 234 across terminals $T_3$, $T_4$ is equal to the mid-value voltage $V_m$, which is also the zero-signal voltage $V_1$ of rectifier 233 for magnetic balance. The two D. C. voltages $V_1$ and $V_2$ are subtracted from each other so that the voltage $(V_1-V_2)$ across terminals $T_5$, $T_6$ will have a polarity corresponding to the direction of the error and a magnitude corresponding to the magnitude of the error. The resulting voltage $(V_1-V_2)$ is supplied to the control coils of the magnetic amplifier.

Stop-motion devices may be provided for stopping the shuttle (1) when the magnitude of the shuttle error surpasses predetermined limits, (2) when the filling breaks, and (3) when excessive heat develops in the shuttle through malfunction of the shuttle mechanism, for example, because of overheating of the bearings, wear of the armature brushes or short circuits in the windings. An effective arrangement of the stop-motion devices is shown diagrammatically in Fig. 35.

In each of the cases referred to above the stopping signal is transmitted from the control coil 235 wound on the middle leg of core 236. Coil 235 is energized by power coil 221. Three switches corresponding to each of the cases referred to above are provided for closing the energizing circuit to coil 235.

Opposite control coil 235 is rotating receiver coil 237 which is attached to reference core 222. If the circuit of the control coil is closed by any of the switches 238, 239 or 240, the receiver coil 237 will be energized and cut off the main circuit of the loom drive motor.

Switch 238 actuated by relay 241 operates in case of excessive error. When the displacement of the shuttle from synchronism exceeds predetermined limits, rotating reference core 242 which is also attached to reference core 222 causes a disturbance of the magnetic balance of control core 243, the coils of which will then energize relay 241 to close switch 238.

Microswitch 239 is closed when the filling thread, passing over a spring-loaded lever attached to switch 239, breaks.

Thermostatic switch 240 is positioned near the motors and closes the circuit of control coil 235 in case of excessive heat development.

I claim:

1. A circular loom having a central rotating shaft, a cam ring concentric with the central shaft adjacent the fell of the shed, a plurality of beat up members having portions engaging the cam of said cam ring and shaped with respect to the cam contour to be projected periodically into the shed against the fell and out of the shed away from the fell along rectilinear paths, and means connecting the central shaft with the cam ring to rotate the cam ring in synchronism with the rotation of the central shaft.

2. A circular loom as defined in claim 1 wherein the face of the cam ring bearing against the beat-up members is a frustoconical surface disposed at an angle to the shed whereby the beat-up members are guided into and out of the fell along rectilinear paths.

3. A circular loom as defined in claim 1 wherein the central shaft is connected with the cam ring through a gear train.

4. A circular loom as defined in claim 1 including harness shaft support members positioned in a circle about the central shaft and a gear train supported thereby connecting the central shaft with said cam ring.

References Cited in the file of this patent

UNITED STATES PATENTS

| | | |
|---|---|---|
| 514,089 | Lombard | Feb. 6, 1894 |
| 628,093 | Herold | July 4, 1899 |
| 2,381,670 | Kurkjian | Aug. 7, 1945 |
| 2,419,437 | Bricout | Apr. 22, 1947 |
| 2,492,514 | Ancet | Dec. 27, 1949 |
| 2,545,593 | Slowak | Mar. 20, 1951 |